United States Patent [19]

Harumatsu et al.

[11] Patent Number: 4,672,563
[45] Date of Patent: Jun. 9, 1987

[54] DIRECTION DETECTION APPARATUS

[75] Inventors: Masatoshi Harumatsu; Masashi Fuse, both of Tamayama; Makoto Tomoyori, Iwate; Noboru Tsushima, Morioka, all of Japan

[73] Assignee: Alps Electric Co. Ltd., Japan

[21] Appl. No.: 818,387

[22] Filed: Jan. 13, 1986

Related U.S. Application Data

[63] Continuation of Ser. No. 350,260, Feb. 19, 1982, abandoned.

[30] Foreign Application Priority Data

Feb. 19, 1981 [JP] Japan .................................. 56-23530

[51] Int. Cl.$^4$ ............................................. G06F 15/50
[52] U.S. Cl. .................................... 364/559; 364/449; 340/988
[58] Field of Search ............... 364/424, 444, 449, 450, 364/460, 559; 340/988; 73/178 R, 1 E, 505, 509, 510; 180/142

[56] References Cited

U.S. PATENT DOCUMENTS 3,532,178 10/1970 Lindbom ............................ 180/140
3,897,846 8/1975 Inoue .................................. 180/142
4,084,241 4/1978 Tsumura ............................ 364/460
4,139,889 2/1979 Ingels ................................ 364/460
4,175,638 11/1979 Christensen ...................... 180/140
4,267,640 5/1981 Wu ...................................... 33/361
4,402,050 8/1983 Tagami et al. .................... 364/450
4,403,291 9/1983 Von Tomkewitsch ............. 364/450
4,435,760 3/1984 Kuno et al. ....................... 364/424

Primary Examiner—Gary Chin
Attorney, Agent, or Firm—Guy W. Shoup

[57] ABSTRACT

In a moving object, such as automobile, having a steering gear which determines a traveling course, and a traveling distance detector which detects a traveling distance; a direction detection apparatus comprising a steering position detector detecting an amount of displacement of the steering gear, and an arithmetic unit which calculates a traveling direction of the moving object from a steering position signal proportional to the amount of displacement and a traveling distance signal proportional to the traveling distance, thereby to detect the traveling direction of the moving object. The apparatus can detect the traveling direction without being affected by a magnetic deviation, an abnormal magnetic field, etc.

5 Claims, 21 Drawing Figures

DIRECTION DETECTION APPARATUS

This is a continuation application from application Ser. No. 350,260 filed Feb. 19, 1982 now abandoned.

BACKGROUND OF THE INVENTION

The present invention relates to a direction detection apparatus. More particularly, it relates to a direction detection apparatus which detects the traveling direction or bearing of a moving object, such as an automobile, equipped with a steering gear and a traveling distance detector, by detecting the amount of displacement of the steering gear and the traveling distance of the moving object.

At present, automobiles are frequently driven locations which are not familiar to the driver. It often occurs that the driver loses the direction of his destination or that even when he consults a map, the map is useless because of an unclear traveling direction. Especially when the automobile is driven in the nighttime, such loss of direction may take place often. Therefore, there is a need for a direction detection apparatus capable of informing the driver of the present traveling direction.

As the direction detection apparatuses of moving objects, there have heretofore been known, for example, one detecting the direction of the earth magnetic field and one utilizing a gyrocompass.

Such direction detection apparatuses, however, have disadvantages as stated below. In case of the former, since the magnetic field of the earth magnetism is feeble, the separation between the earth magnetism and noise is difficult, and a satisfactory sensitivity is not attained. Moreover, unless corrections are made, a correct direction cannot be determined on account of the influence of a magnetic deviation or a regionally abnormal magnetic field. In case of the latter, since the gyrocompass itself has a mechanism of high precision, a high degree of skill is required for the adjustment of the apparatus. Moreover, the apparatus becomes high in price and is liable to become large in size. Therefore, the apparatus is unsuitable for installation on automobiles.

SUMMARY OF THE INVENTION

The present invention has for its object to eliminate the disadvantages described above, and to provide a direction detection apparatus which detects the direction of a moving vehicle on the basis of a steering angle and a traveling distance, which has a small-sized, inexpensive and simple structure suitable for installation on the moving vehicle such as automobile and which can detect the traveling direction without being influenced by a magnetic deviation, an abnormal magnetic field, etc.

In one aspect of the present invention, there is provided a direction detection apparatus for a moving vehicle having a steering gear which determines a traveling course, and a traveling distance detector which measures a traveling distance; characterized by comprising a steering position detector which detects an amount of displacement of said steering gear of said moving vehicle, and an arithmetic unit which calculates a traveling direction of said moving object from a steering position signal proportional to said amount of displacement detected by said steering position detector and a traveling distance signal proportional to said traveling distance detected by said traveling distance detector, thereby to detect said traveling direction of said moving object.

PREFERRED EMBODIMENTS OF THE INVENTION

Figure 1A:
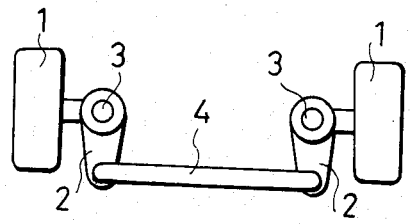
FIGS. 1(A) and 1(B) are plan views for explaining a steering mechanism.
Figure 1B:
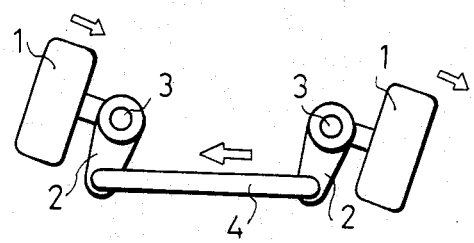

Moving objects, especially automobiles, change the traveling direction ordinarily by changing the direction of the front wheels. FIGS. 1(A) and 1(B) show the steering mechanism of the front wheels of an automobile. Numerals 1 designate the front wheels. Numerals 2 designate knuckles which move rightward and leftward with respect to shafts 3 and which change the direction of the front wheels 1 through their movements. Numeral 4 indicates a tie rod, which is moved rightward or leftward through transmission means such as linkage by the rotation of a steering wheel (handle) not shown.

One end of the knuckle 2 is held in turnable engagement with the corresponding end of the tie rod 4, and the right and left knuckles 2 move interlockingly with the rightward or leftward movement of the tie rod 4. When the steering wheel is rotated clockwise, the tie rod 4 and the wheels 1 move in the directions of the arrows indicated in FIG. 1(B).

Figure 2:
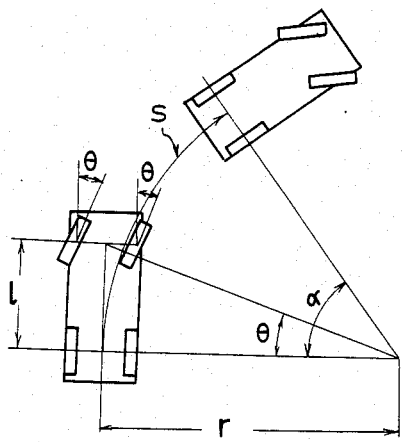
FIG. 2 is a view for explaining the principle of the present invention.

Now, letting $\theta$ denote the steering angle of the front wheels 1 and $l$ denote the wheel base as illustrated in FIG. 2, the automobile turns through an arc of a radius r. At this time, the radius r is expressed by:

$$r = l \cot \theta \quad (1)$$

Letting S denote the length of the arc and $\alpha$ denote the central angle of the arc, the following expression holds:

$$S = r\alpha \quad (2)$$

Accordingly, the bearing at the time when the automobile has turned along the entire arc defines the angle $\alpha$ with respect to the initial bearing. From Expressions (1) and (2), the angle $\alpha$ is denoted by the following:

$$\alpha = S/r = S/(l \cot \theta) = (S/l) \times \tan \theta \quad (3)$$

As understood from Expression (3), the traveling direction $\alpha$ of the automobile can be detected by measuring the length S of the arc, in other words the traveling distance of the automobile, and the steering angle $\theta$.

Figure 3:
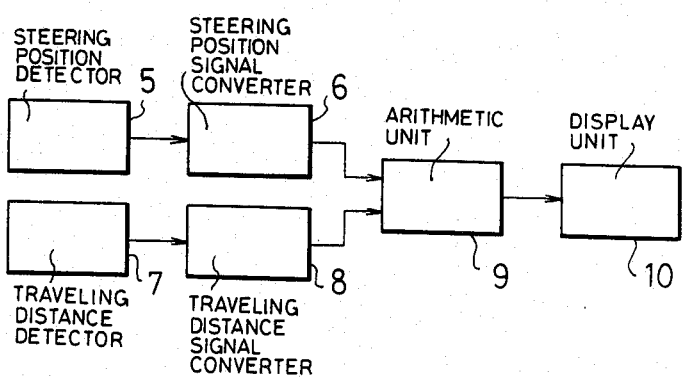
FIG. 3 is a block diagram showing an embodiment of a direction detection apparatus according to the present invention.

In a direction detection apparatus according to the present invention illustrated in FIG. 3, numeral 5 designates a steering position detector, which detects the amount of displacement of a steering gear. A steering position signal converter 6 provides a signal which is proportional to the amount of displacement of the steering gear detected by the steering position detector 5. Numeral 7 designates a traveling distance detector. A traveling distance signal converter 8 provides a signal which is proportional to a traveling distance detected by the traveling distance detector 7. Numeral 9 indicates an arithmetic unit, and numeral 10 a display unit.

Figure 4:
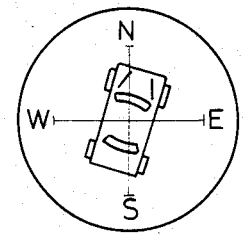
FIG. 4 shows an example of the aspect of display for use in the direction detection apparatus according to the present invention.

The steering angle $\theta$ detected by the steering position detector 5 is converted into the magnitude of, for example, an electric signal by the steering position signal converter 6. The steering position signal proportional to the steering angle $\theta$ is applied to the arithmetic unit 9. On the other hand, the traveling distance S measured by the traveling distance detector 7 is converted into the magnitude of, for example, an electric signal by the traveling distance signal converter 8. The traveling distance signal proportional to the traveling distance is applied to the arithmetic unit 9. The arithmetic unit 9 executes the operation indicated by Expression (3), and delivers the result to the display unit 10 which displays the traveling direction of the automobile. The display unit 10 displays the direction signal from the arithmetic unit 9 in a form easy for visual reading, for example, as the inclination of the picture of the automobile shown in FIG. 4.

There will now be described the steering position detector 5 for obtaining the steering position signal.

Figure 5:
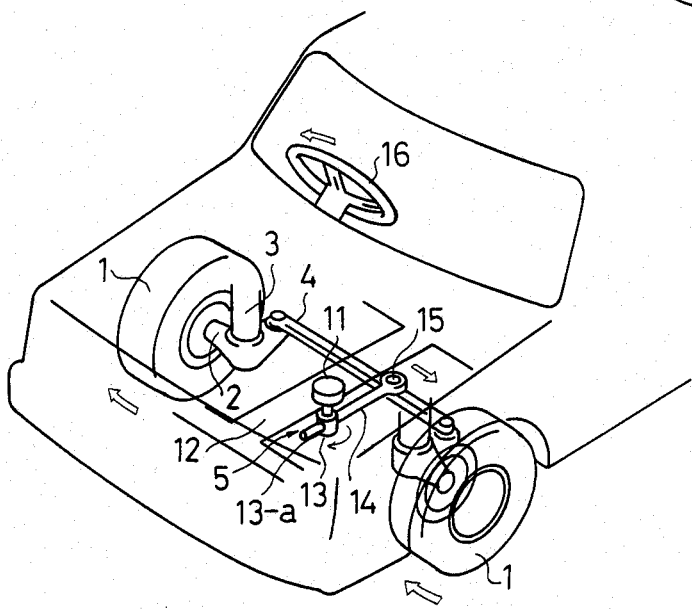
FIG. 5 is a perspective view showing an embodiment of a steering position detector.

In a perspective view of FIG. 5 showing an embodiment of the steering position detector, numerals 1 to 4 correspond to those in FIG. 1, respectively, and numeral 5 corresponds to that in FIG. 5. Numeral 11 designates a rotary variable resistor, numeral 12 a car body frame, numeral 13 a rotary shaft provided with a hole 13-a, numeral 14 an arm, numeral 15 a pin, and numeral 16 the steering wheel.

The rotary variable resistor 11 is fixedly mounted on the car body frame 12, and has its shaft fastened to the rotary shaft 13. The arm 14 is slidably fitted through the hole 13-a provided in the rotary shaft 13. The end of the arm 14 remote from the rotary shaft 13 is rotatably fastened to the tie rod 4 with the pin 15. Thus, the arm 14 carries out a swinging motion with the rotary shaft 13 as its axis in response to the rightward and leftward movements of the tie rod 4.

Assuming now that the steering wheel 16 has been turned in the direction of arrow indicated in FIG. 5, the tie rod 4 is moved in the illustrated direction of the arrow by a transmission mechanism such as linkage not shown, and also the front wheels 1 are moved in the direction of the arrows through the knuckles 2. At this time, one end of the arm 14 is moved in the direction of the arrow unitarily with the tie rod 4, and the rotary shaft 13, in other words the shaft of the rotary variable resistor 11, is rotated by the swinging motion of the arm 14. The angle of rotation of the shaft of the rotary variable resistor 11 is determined by the angle of movement of the arm 14, in other words, the amount of displacement of the position of the tie rod 4. In addition, once the amount of displacement of the position of the tie rod 4 has been determined, the direction of the front wheels 1 is determined. Accordingly, the steering angle of the front wheels 1 is proportional to the rotational angle of the shaft of the rotary variable resistor 11.

Figure 6:
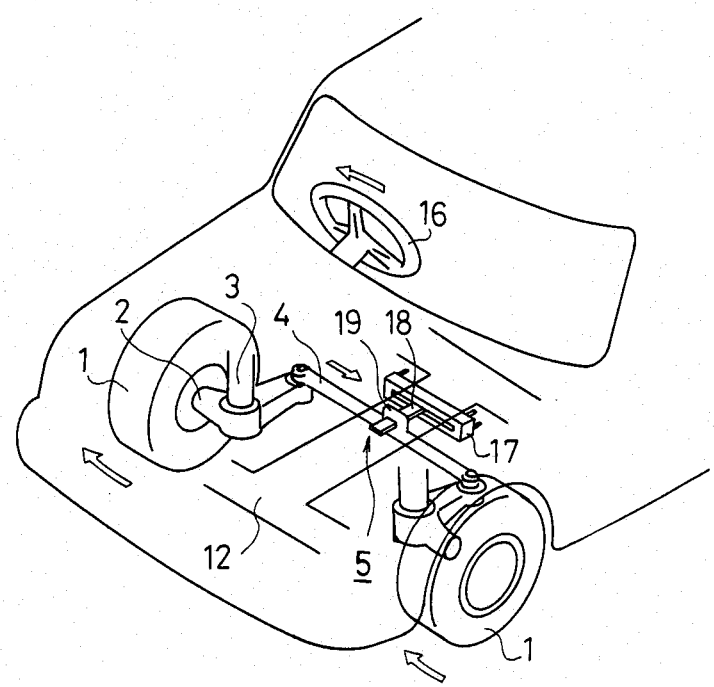
FIG. 6 is a perspective view showing another embodiment of the steering position detector.

In a perspective view of FIG. 6 showing another embodiment of the steering position detector, numerals 1 to 4 correspond to those in FIG. 1, numeral 5 that in FIG. 3, and numerals 12 and 16 those in FIG. 5, respectively. Numeral 17 designates a slide rheostat, numeral 18 a lever, and numeral 19 a hole portion which is provided in the tie rod 4.

The slide rheostat 17 is fixedly mounted on the car body frame 12, and its slider is joined with that end of the lever 18 inserted in the hole portion 19 of the tie rod 4 which is opposite to the hole portion.

Assuming now that the steering wheel 16 has been turned in the direction of the arrow indicated in FIG. 6, the tie rod 4 is moved in the illustrated direction of the arrow by the transmission mechanism such as linkage not shown, and also the front wheels 1 are moved in the direction of the arrows through the knuckles 2. The movement of the tie rod 4 in the direction of the arrow results in moving the lever 18 inserted through the hole portion 19 of the tie rod 4, so that the position of the slider of the slide rheostat 17 changes. Since the change of the position of the slider of the slide rheostat 17 is proportional to the amount of displacement of the position of the tie rod 4 and the direction of the front wheels 1 is also determined by the same amount of displacement, the steering angle of the front wheels 1 is proportional to the amount of displacement of the slider of the slide rheostat 17.

Figure 7:
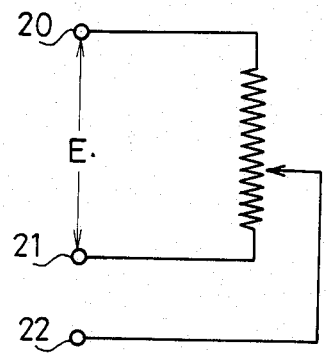
FIG. 7 shows an example of a circuit for obtaining a steering position signal from the steering position detector of FIG. 5 or FIG. 6, FIGS. 8(A) and 8(B) and FIGS. 9(A) and 9(B) are perspective views showing further embodiments of the steering position detector, respectively.

In order to use the rotary variable resistor 11 or the slide rheostat 17 as the steering position signal converter 6 shown in FIG. 3, a voltage E is kept applied across terminals 20 and 21 as illustrated in FIG. 7. Then, the steering position signal corresponding to the amount of displacement from the steering position detector 5 is obtained between, for example, a movable terminal 22 and the terminal 20.

The steering mechanisms of automobiles are not uniform and there are various types depending upon the kind of automobile. It is therefore necessary to obtain the steering position signal by the use of the steering position detector 5 and the steering position signal converter 6 suited therefor as shown in FIG. 3.

Figure 8A:
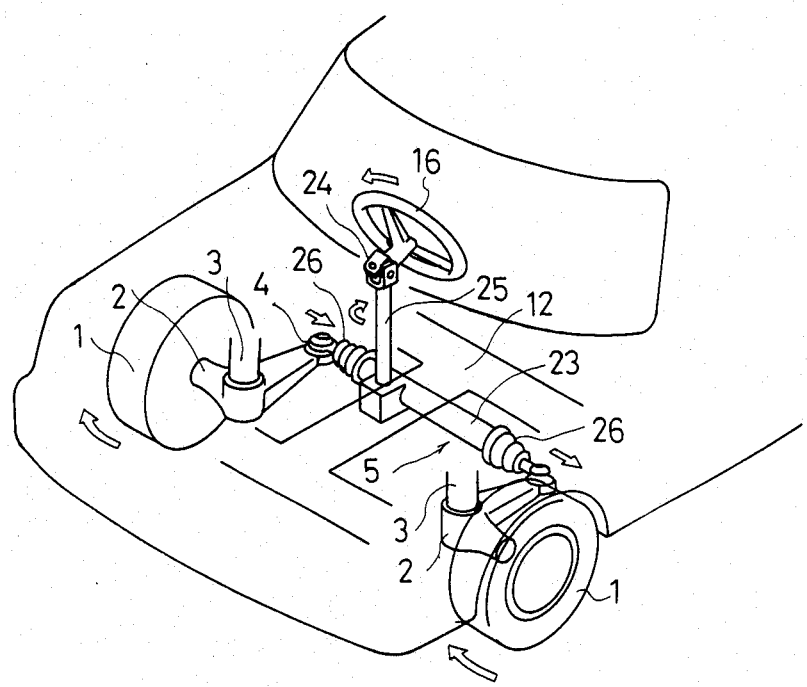
Figure 8B:
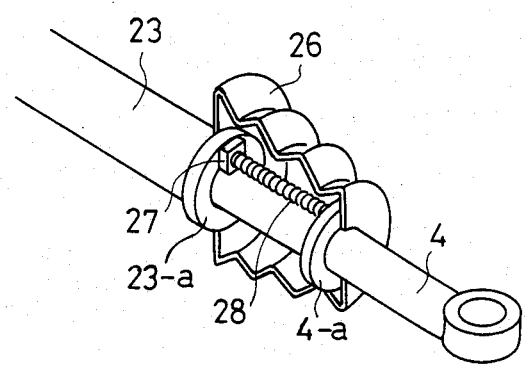

In perspective views of FIGS. 8(A) and 8(B) showing another embodiment of the steering position detector, numerals 1 to 4 correspond to those in FIG. 1, and numerals 12 and 16 those in FIG. 5, respectively. Symbol 4-a indicates a flange, numeral 23 a gear box, symbol 23-a a flange, numeral 24 a joint, numeral 25 a shaft, numeral 26 bellows, numeral 27 a pressure sensor, and numeral 28 a spring.

As shown in FIGS. 8(A) and B(B), the tie rod 4 is assembled in the gear box 23. The rotation of the steering wheel 16 has its axial direction changed by the joint 24, and is transmitted to the shaft 25. The rotation transmitted to the shaft 25 is converted into the rightward or leftward rectilinear motion of the tie rod 4 within the gear box 23. The bellows 26 covers movable portions of the tie rod 4 and parts of the gear box 23. As shown in FIG. 8(B), the flange 23-a is disposed at that end part of the gear box 23 which is covered with the bellows 26, and the pressure sensor 27 is disposed on the side surface of the flange 23-a. The spring 28 is retained between the flange 4-a provided in the tie rod 4 and a pressure-sensitive portion located in the central part of the pressure sensor 27 under the state under which a proper pressure is applied.

Supposing now that the steering wheel 16 has been turned clockwise as indicated by an arrow in FIG. 8(A), the shaft 25 is rotated clockwise as indicated by an arrow in the figure through the joint 24, and the tie rod 4 is moved rightward as indicated by arrows in the figure by means of the mechanism of the gear box 23, so that the front wheels 1 are turned rightward as indicated by the arrows in the figure through the knuckles 2. Here, when the tie rod 4 has been moved rightward as indicated by the arrows in the figure, the spring 28 is stretched, so that the pressure acting on the pressure-sensitive portion of the pressure sensor 27 decreases.

Since, in this manner, the position of the tie rod 4 is determined by the steering position of the front wheels 1, the pressure acting on the pressure-sensitive portion of the pressure sensor 27 is proportional to the steering position of the front wheels. By detecting the pressure on the pressure sensor 27, accordingly, the steering position detector 5 in FIG. 3 is realized, and the function of the steering position signal converter 6 is effected.

Figure 9:
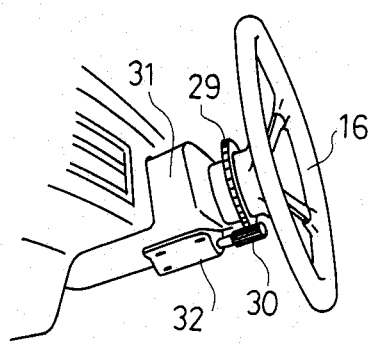
Figure 9:
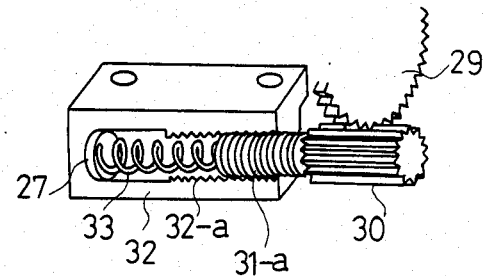

In perspective views of FIGS. 9(A) and 9(B) showing another embodiment of the steering position detector, numeral 16 corresponds to that in FIG. 5, and numeral 27 that in FIG. 8(B). Numerals 29 and 30 indicate gears, numeral 31 indicates a steering column, and symbol 31-a indicates a male screw which is formed unitarily with the gear 30. Further, numeral 32 denotes a bracket, symbol 32-a a female screw which is threaded in the bracket 32, and numeral 33 a spring.

Upon turning the steering wheel 16, the gear 29 mounted unitarily therewith is rotated, and the rotation is transmitted to the gear 30 meshing with the gear 29. The male screw 31-a formed unitarily with the gear 30 is held in threadable engagement with the female screw 32-a formed in the bracket 32 fixed to the steering column 31. In accordance with the rotation of the gear 30, the male screw 31-a is moved in the axial direction thereof. The axial movement of the male screw 31-a is transmitted to the pressure sensor 27 which is depressed under a proper pressure through the spring 33 as in the foregoing description.

Supposing now that the steering wheel 16 has been turned clockwise, the gear 29 is rotated clockwise, and the gear 30 is rotated counterclockwise. The male screw 31-a is moved rightward with respect to the bracket 32, so that the pressure acting on the pressure sensor 27 through the spring 33 decreases. The decrease rate of the pressure is proportional to the rotational angle of the steering wheel 16. The clockwise turning of the steering wheel 16 results in turning the front wheels 1 rightward through the transmission means such as linkage, and the turning angle of the front wheels 1 is proportional to the rotational angle of the steering wheel 16. By detecting the pressure on the pressure sensor 27, therefore, the steering position of the front wheels 1 can be known. That is, the functions of the steering position detector 5 and the steering position signal converter 6 in FIG. 3 are fulfilled.

Now, the pressure sensor 27 used as the steering position signal converter 6 will be briefly described.

The pressure sensor includes various types, which are used as the steering position signal converter 6 described before.

Figure 10:
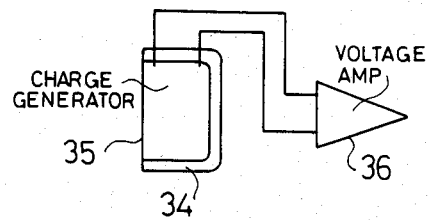
FIG. 10 shows an embodiment which employs a charge generator in order to obtain a steering position signal from the steering position detector of FIGS. 8(A) and 8(B) or FIGS. 9(A) and 9(B), FIGS. 11(A) and 11(B) are a plan view and a sectional view, respectively, of an embodiment which employs piezoelectric films and a diaphragm in order to obtain a steering position signal from the steering position detector of FIGS. 8(A) and 8(B) or FIGS. 9(A) and 9(B)

FIG. 10 shows a pressure sensor employing an electrostriction transducer. Referring to the figure, numeral 34 designates an insulating protective case. Numeral 35 designates a charge generator which is constructed of the electrostriction transducer and which is made of an electrostrictive material having a sufficiently large capacitance, for example, quartz crystal, Rochelle salt or barium titanate. Numeral 36 indicates a voltage amplifier circuit.

Charges are generated in proportion to a pressure applied to the charge generator 35 constructed of the electrostriction transducer. The charges are discharged through the voltage amplifier circuit 36. Letting V denote a voltage which is applied across the input terminals of the voltage amplifier circuit 36, R denote the input impedance of the voltage amplifier circuit 36, and C denote the capacitance of the charge generator 35, the voltage V after a time t from the initiation of the discharge is expressed by:

$$V \alpha Q/C \times e^{-t/RC}$$

As seen from the expression, the voltage V decreases with the lapse of time. In order to measure the voltage V precisely, accordingly, the charge generator 35 is made one having the sufficiently large capacitance C, and the voltage amplifier circuit 36 is made one having the sufficiently high input impedance R.

Figure 11A:
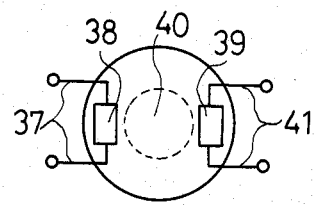
Figure 11B:
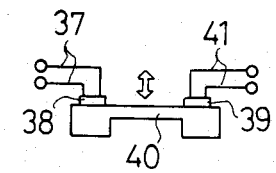

FIGS. 11(A) and 11(B) show a pressure sensor which employs piezoelectric films and a diaphragm. Referring to the figures, numerals 37 designate A.C. signal input terminals, numerals 38 and 39 piezoelectric films, numeral 40 a diaphragm, and numerals 41 output terminals.

When an A.C. signal on the order of, for example, 100 Hz is applied across the A.C. signal input terminals 37, vibrations are generated in the piezoelectric film 38 and pass through the diaphragm 40 in the form of surface elastic waves. Thereafter, the vibrations are transmitted to the piezoelectric film 39 at the opposite end and become an A.C. signal again. This A.C. signal is delivered from the output terminals 41. When a pressure acting on the central part of the diaphragm 40 has changed as indicated by an arrow in FIG. 11(B), the frequency of the A.C. output signal which is delivered across the output terminals 41 changes in proportion to the change of the pressure acting on the diaphragm 40.

Figure 12:
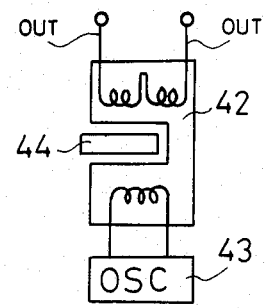
FIG. 12 shows an embodiment which employs a differential transformer and a core in order to obtain a steering position signal from the steering position detector of FIGS. 8(A) and 8(B) or FIGS. 9(A) and 9(B), FIGS. 13(A) and 13(B) are a perspective view and a sectional perspective view, respectively, of an embodiment which employs a diaphragm and piezoelectric resistance elements in order to obtain a steering position signal from the steering position detector of FIGS. 8(A) and 8(B) or FIGS. 9(A) and 9(B), FIGS. 14(A) and 14(B) are a perspective view and a sectional perspective view, respectively, of an embodiment which employs a diaphragm type capacitor in order to obtain a steering position signal from the steering position detector of FIGS. 8(A) and 8(B) 8(B) or FIGS. 9(A) and 9(B)

FIG. 12 shows a pressure sensor which employs a differential transformer and a core. Referring to the figure, numeral 42 designates a differential transformer, numeral 43 an oscillator, numeral 44 a core, and symbols OUT output terminals.

The core 44 is supported in the neutral position of the differential transformer 42 by, for example, a spring not shown. In case where the core 44 has moved under a pressure, a positive or negative voltage change proportional to the direction and amount of the movement appears across the output terminals OUT.

Figure 13A:
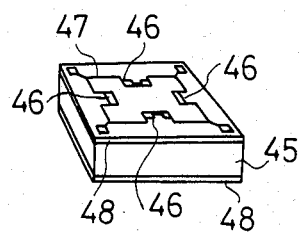
Figure 13B:
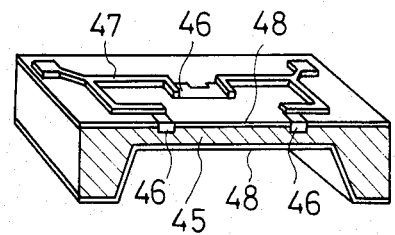

FIGS. 13(A) and 13(B) show a pressure sensor which employs a diaphragm and piezoelectric resistance elements. In the figures, numeral 45 designates a diaphragm of silicon which has a thickness of, for example, 175–250 μm or so and the central part of which is made thin as illustrated in FIG. 13(B). Numerals 46 indicate piezoelectric resistance elements which are formed in the surface of the diaphragm 45 by diffusion or the like. Numeral 47 indicates an output terminal. Numerals 48 represent protective films of silicon dioxide which are, for example, approximately 5–25 μm thick and which cover the surface of the diaphragm 45.

When a pressure acting on the central part of the diaphragm 45 has changed, this diaphragm is deformed, and simultaneously, the piezoelectric resistance elements are deformed. Since the resistance values of the piezoelectric resistance elements 46 change in proportion to the deformations thereof, the change of the pressure applied to the diaphragm 45 can be derived from the output terminal 47 connected to the piezoelectric resistance elements 46.

Figure 14A:
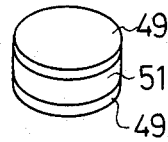
Figure 14B:
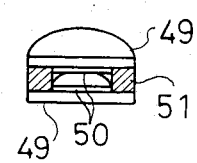

FIGS. 14(A) and 14(B) show a pressure sensor which employs a diaphragm type capacitor. Numerals 49 designate diaphragms which are made of, for example, alumina or quartz crystal. Numerals 50 indicate electrodes, and numeral 51 indicates a seal.

On the inner surfaces of the two diaphragms 49 holding the seal 51 therebetween, the electrodes 50 are formed in opposition to each other so as to construct a capacitor. When a pressure has acted between the two diaphragms 49, the spacing of the electrodes 50 opposing to each other changes, and hence, the capacitance between these electrodes changes.

Figure 15:
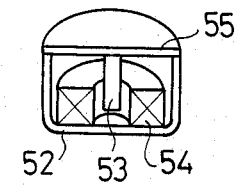
FIG. 15 is a sectional perspective view of an embodiment which employs a core and a coil in order to obtain a steering position signal from the steering position detector of FIGS. 8(A) and 8(B) or FIGS. 9(A) and 9(B).

FIG. 15 shows a pressure sensor which employs a core and a coil. In the figure, numeral 52 represents a case, numeral 53 a core, numeral 54 a coil, and numeral 55 a diaphragm.

Inside the case 52, the coil 54 is disposed in the shape of a ring. The core 53 is movably disposed centrally of the coil 54. The upper end of the core 53 is attached to the diaphragm 55 which is an elastic member. Accordingly, when the diaphragm 55 has curved under a pressure, the core 55 moves upward or downward in the central space of the coil 54, and the inductance of the coil 54 changes. That is, the inductance of the coil 54 changes in proportion to the pressure applied to the diaphragm 55.

As set forth above, according to the present invention, a steering position signal is obtained on the basis of the amount of displacement of a steering gear by a small-sized, inexpensive and simple structure, so that the traveling direction of a moving object can be detected on the basis of signals from signal converters connected to a steering position detector and a traveling distance detector respectively. Since these signals are not obtained by detecting any magnetic field, they are not affected by a magnetic deviation or an abnormal magnetic field, so that the direction detection apparatus of the present invention operates normally at all times.

A display unit can be additionally provided with an odometer, an X-Y plotter or the like, and can display the traveling locus of the moving object thereon.

What is claimed is:

1. An apparatus for measuring the change in bearing of a travelling vehicle and providing an output of the measured bearing change comprising as part of said vehicle:
    (a) actuatable steering means for causing said vehicle to execute a turn which is generally proportional to the degree of actuation of said steering means;
    (b) first measuring means coupled to said steering means for measuring the degree of actuation of said steering menas and outputting an actuation signal indicative of the measured degree of actuation;
    (c) second measuring means for measuring the distance travelled by said vehicle and outputting a distance signal indicating the measured distance;
    (d) computing means responsive to said actuation and distance signals for calculating and outputting a bearing change signal which is a function of the actuation and distance signals; and
    (e) output means for indicating the change in bearing of said vehile resulting from said vehicle travelling said measured distance with the steering means actuated by said measured degree of actuation.

2. An apparatus according to claim 1 wherein said steering means includes a steering mechanism coupled to wheels on which said vehicle travels, the wheels being shifted to a steering angle $\theta$ when the the steering means is actuated and thereby causing said travelling vehicle to travel an arc shaped path having a radius of curvature r wherein said computing means includes means for calculating the bearing change S/r where S is the measured distance and r is a function of the measured degree of actuation $\theta$.

3. An apparatus according to claim 2 wherein said computing means includes means for calculating (S/l) tan $\theta$ where $\theta$ is a function of the measured degree of actuation and l corresponds to the wheel base of the vehicle.

4. An apparatus according to claim 1 wherein said output means comprises display means receiving said bearing change signal for indicating the bearing of said vehicle.

5. A method for measuring the change in bearing of a travelling vehicle due to actuation of a steering mechanism of asid vehicle comprising the following steps performed aboard said vehicle:
    measuring the degree of actuation of said steering mechanism and producing an actuation signal indicative of the measured degree of actuation;
    measuring the distance travelled by said vehicle at least during a period when the steering mechanism is actuated and producing a distance signal indicating the measured distance; receiving the distance and actuation signals, and on the basis thereof, computing the change in bearing of said vehicle resulting from said vehicle travelling the measured distance with its steering mechanism actuated by the measured degree of actuation; and displaying the vehicle bearing change based on the results of said computation.

* * * * *